(12) United States Patent
Ahn et al.

(10) Patent No.: US 10,832,624 B2
(45) Date of Patent: Nov. 10, 2020

(54) DRIVING DEVICE OF DISPLAY PANEL AND DISPLAY DEVICE INCLUDING THE SAME

(71) Applicant: Samsung Display Co., Ltd., Yongin-Si (KR)

(72) Inventors: Junyong Ahn, Seoul (KR); Namsoo Kang, Asan-si (KR); Soonkyeong Kwon, Seoul (KR); Sunghyun Kim, Hwaseong-si (KR); Yoonsup Kim, Suwon-si (KR); Sewon Min, Asan-si (KR); Kihyun Sung, Incheon (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 16/222,077

(22) Filed: Dec. 17, 2018

(65) Prior Publication Data

US 2019/0206348 A1 Jul. 4, 2019

(30) Foreign Application Priority Data

Dec. 29, 2017 (KR) .................. 10-2017-0184279

(51) Int. Cl.
*G09G 3/36* (2006.01)
*G02F 1/1345* (2006.01)
*H04M 1/02* (2006.01)
*G02F 1/1362* (2006.01)

(52) U.S. Cl.
CPC ....... *G09G 3/3648* (2013.01); *G02F 1/13452* (2013.01); *G02F 1/13454* (2013.01); *G02F 1/1362* (2013.01); *H04M 1/0266* (2013.01)

(58) Field of Classification Search
None
See application file for complete search history.

(56) References Cited

U.S. PATENT DOCUMENTS

2016/0365019 A1* 12/2016 Lee .................. G09G 3/2003

FOREIGN PATENT DOCUMENTS

| KR | 1020030024116 A | 3/2003 |
| KR | 1020090099668 A | 9/2009 |
| KR | 1020160017246 A | 2/2016 |
| KR | 101761400 B1 | 7/2017 |

* cited by examiner

*Primary Examiner* — Kenneth B Lee, Jr.
(74) *Attorney, Agent, or Firm* — Cantor Colburn LLP

(57) ABSTRACT

A driving device of a display panel includes a timing controller which converts a first image data to a second image data, and generates control signals that control a driving timing of the second image data, a gamma data provider which determines a driving frequency of the second image data based on the number of a counting signal output during an active period and a blank period of a vertical synchronized signal, and outputs one of gamma data sets based on the driving frequency, a data driver which generates a data signal corresponding to the second image data based on the one of the gamma data set, and provides the data signal to a data line of a display panel based on the control signals, and a gate driver which provides the gate signal to a gate line of the display panel based on the control signals.

20 Claims, 12 Drawing Sheets

DRIVING DEVICE OF DISPLAY PANEL AND DISPLAY DEVICE INCLUDING THE SAME

This application claims priority to Korean Patent Application No. 10-2017-0184279, filed on Dec. 29, 2017, and all the benefits accruing therefrom under 35 U.S.C. § 119, the content of which in its entirety is herein incorporated by reference.

BACKGROUND

1. Field

Exemplary embodiments relate generally to a driving device of a display panel and a display device including the same.

2. Description of the Related Art

A liquid crystal display ("LCD") panel of an LCD device includes a lower substrate, an upper substrate, and a liquid crystal layer interposed between the lower substrate and the upper substrate.

The lower substrate includes a first base substrate, a gate line and a data line formed on the first based substrate, a switching element electrically coupled to the gate line and the data line, and a pixel electrode electrically coupled to the switching element.

The upper substrate includes a second base substrate facing the first substrate, a color filter formed on the second base substrate, and a common electrode formed on the color filter.

The liquid crystal layer includes a liquid crystal of which an arrangement is changed according to an electric field generated due to a pixel voltage applied to the pixel electrode and a common voltage applied to the common electrode.

SUMMARY

Display quality of a liquid crystal display ("LCD") device may be degraded by a response speed of a liquid crystal and a leakage current when a driving frequency of the LCD device is changed.

Some exemplary embodiments provide a driving device of a display panel capable of improving display quality.

Some exemplary embodiments provide a display device capable of improving display quality.

According to an exemplary embodiment, a driving device of a display panel may include a timing controller which converts a first image data provided from an external device to a second image data, and generates control signals that control a driving timing of the second image data, a gamma data provider which determines a driving frequency of the second image data based on a number of a counting signal output during an active period and a blank period of a vertical synchronized signal, and outputs one of a plurality of gamma data sets based on the driving frequency, a data driver which generates a data signal corresponding to the second image data based on the one of the plurality of gamma data sets, and provides the data signal to a data line of a display panel based on the control signal, and a gate driver which provides the gate signal to a gate line of the display panel based on the control signal.

In an exemplary embodiment, the gamma data provider may include a counter which counts the number of the counting signal output during the active period and the blank period of the vertical synchronized signal, a gamma selector which outputs a gamma select signal based on the number of the counting signal, and a gamma storage which stores the plurality of gamma data sets, and outputs the one of the plurality of gamma data sets based on the gamma select signal.

In an exemplary embodiment, the gamma selector may compare the number of the counting signal to a first reference number and a second reference number less than the first reference number and output the gamma select signal based on a comparing result.

In an exemplary embodiment, the gamma selector may output a first gamma select signal when the number of the counting signal is larger than the first reference number, output a second gamma select signal when the number of the counting signal is less than the second reference number, and output a third gamma select signal when the number of the counting signal is less than the first reference number and larger than the second reference number.

In an exemplary embodiment, the gamma storage may include a first gamma data set for high frequency which is output in response to the first gamma select signal, a second gamma data set for low frequency which is output in response to the second gamma select signal, and a third gamma data set for default which is output in response to the third gamma select signal.

In an exemplary embodiment, the counting signal may be a data enable signal output as a uniform size and a regular cycle during the active period and the blank period of the vertical synchronized signal.

In an exemplary embodiment, the plurality of gamma data sets may be implemented as a lookup table ("LUT").

In an exemplary embodiment, the gamma data provider may be coupled to the timing controller.

In an exemplary embodiment, the gamma data provider may be located in the timing controller.

In an exemplary embodiment, the driving device of the display panel may further include a gamma reference voltage generator which generates a gamma reference voltage provided to the data driver.

In an exemplary embodiment, the data driver may include a digital gamma unit which generates a gamma voltage based on a gamma reference voltage and the one of the plurality of gamma data sets provided from the gamma data provider, a digital-analog convertor ("DAC") which generates a gamma data signal corresponding to the second image data based on the gamma voltage, and an output buffer which converts the gamma data signal to the data signal and outputs the data signal.

In an exemplary embodiment, the digital gamma unit may receive a first gamma reference voltage, a second gamma reference voltage, a third gamma reference voltage and a fourth gamma reference voltage. The digital gamma unit may generate gamma voltages between the first gamma reference voltage and the second gamma reference voltage and gamma voltages between the third gamma reference voltage and the fourth gamma reference voltage based on the one of the plurality of gamma data sets.

In an exemplary embodiment, the output buffer may amplify the gamma data signal and convert to the data signal.

In an exemplary embodiment, the output buffer may control an output timing of the data signal.

According to an exemplary embodiment, a display device may include a display panel including a plurality of pixels and a driver which provides a data signal and a gate signal to the pixels. The driver may include a timing controller which converts a first image data provided from an external device to a second image data and generates control signals that control a driving timing of the second image data, a gamma data provider which determines a driving frequency of the second image data based on a number of a counting signal output during an active period and a black period of a vertical synchronized signal, and outputs one of a plurality of gamma data sets based on the driving frequency, a data driver which generates the data signal corresponding to the second image data based on the one of the plurality of gamma data sets, and to output the data signal to a data line of the display panel based on the control signals, and a gate driver which outputs the gate signal to a gate line of the display panel based on the control signals.

In an exemplary embodiment, gamma data provider may include a counter which counts the number of the counting signal output during the active period and the blank period of the vertical synchronized signal, a gamma selector which outputs a gamma select signal based on the number of the counting signal, and a gamma storage which stores a plurality of gamma data sets, and outputs the one of the gamma data sets based on the gamma select signal.

In an exemplary embodiment, the gamma selector may compare the number of the counting signal to a first reference number and a second reference number less than the first reference number and output the gamma select signal based on a comparing result.

In an exemplary embodiment, the gamma selector may output a first gamma select signal when the number of the counting signal is larger than the first reference number, output a second gamma select signal when the number of the counting signal is less than the second reference number, and output a third gamma select signal when the number of the counting signal is less than the first reference number and larger than the second reference number.

In an exemplary embodiment, the gamma storage may include a first gamma data set for high frequency which is output in response to the first gamma select signal, a second gamma data set for low frequency which is output in response to the second gamma select signal, and a third gamma data set for default which is output in response to the third gamma select signal.

In an exemplary embodiment, the data driver may include a digital gamma unit which generates a gamma voltage based on a gamma reference voltage and the one of the plurality of gamma data sets provided from the gamma data provider, a digital-analog convertor ("DAC") which generates a gamma data signal corresponding to the second image data based on the gamma voltage, and an output buffer which converts the gamma data signal to the data signal and outputs the data signal.

Therefore, the driving device of the display panel and the display device having the same may prevent driving frequency of the display panel to be changed by determining the driving frequency of the image data based on the number of the counting signal output during the active period and the blank period of the vertical synchronized signal, outputting one of the gamma data sets according to the driving frequency, and generating the gamma voltage based on the gamma reference voltage and gamma data set. Thus, the driving device of the display panel and the display device having the same may prevent brightness to be changed by the driving frequency. Therefore, display quality of the display device may improve.

BRIEF DESCRIPTION OF THE DRAWINGS

Illustrative, non-limiting exemplary embodiments will be more clearly understood from the following detailed description taken in conjunction with the accompanying drawings.

DETAILED DESCRIPTION

Figure 1:
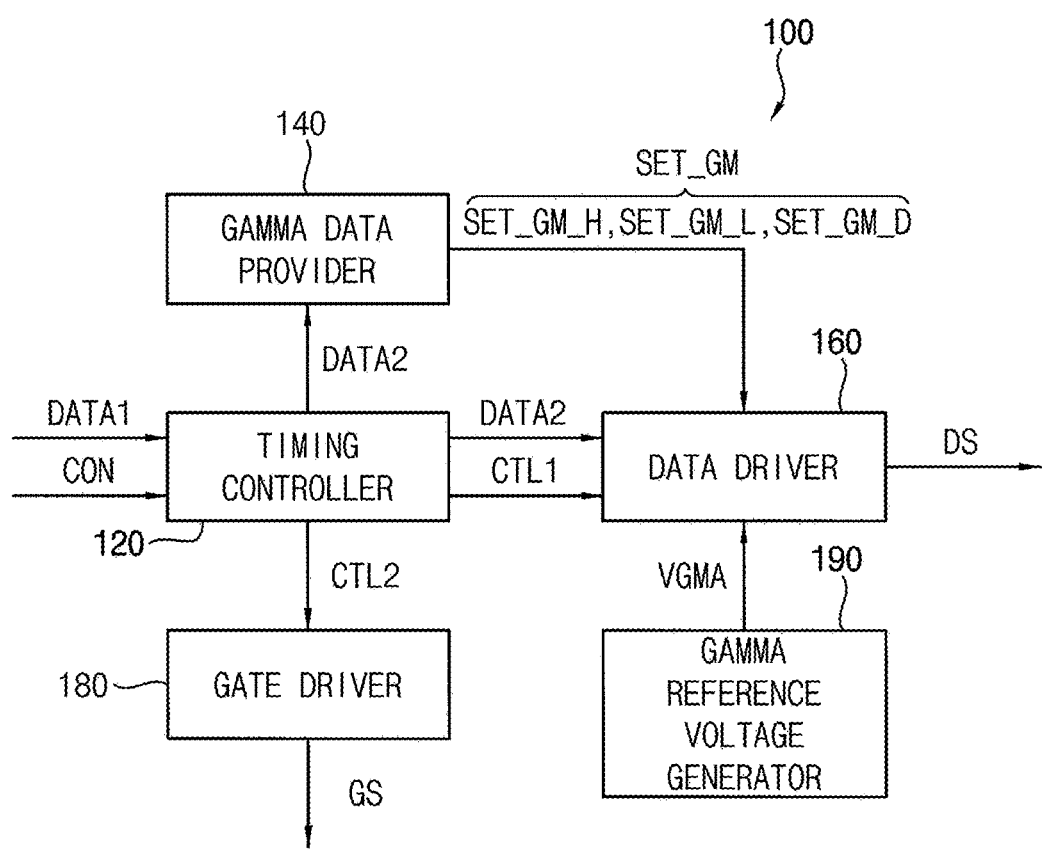
FIG. 1 is a block diagram illustrating an exemplary embodiment of a driving device of a display panel.

Hereinafter, the invention will be explained in detail with reference to the accompanying drawings. This invention may, however, be embodied in many different forms, and should not be construed as limited to the embodiments set forth herein. Rather, these embodiments are provided so that this invention will be thorough and complete, and will fully convey the scope of the invention to those skilled in the art. Like reference numerals refer to like elements throughout.

It will be understood that when an element is referred to as being "on" another element, it can be directly on the other element or intervening elements may be therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise.

"Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. In an exemplary embodiment, when the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, when the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the invention, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. In an exemplary embodiment, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the claims.

Figure 2:
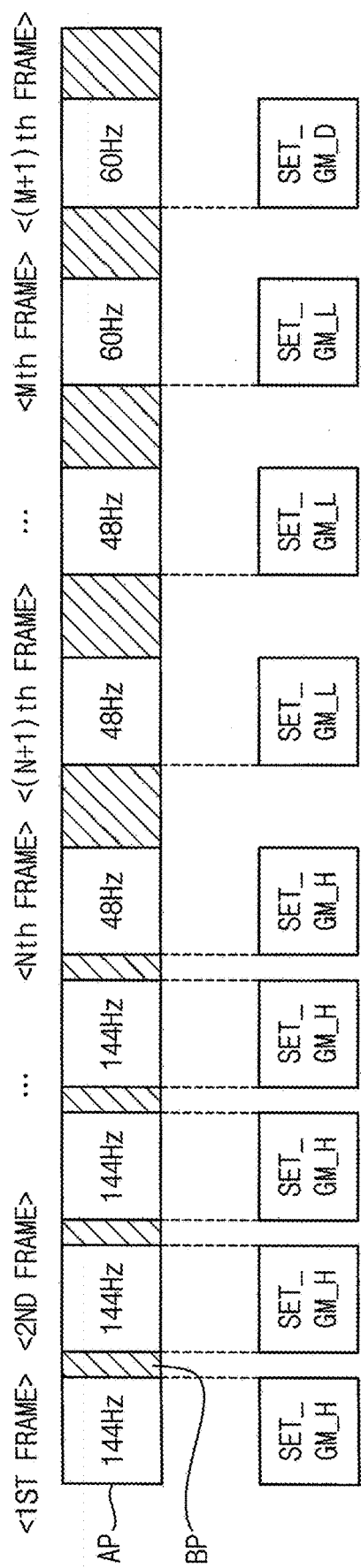
FIGS. 2, 3A, and 3B are diagrams illustrating for describing an operation of a gamma data provider included in the driving device of the display panel of FIG. 1.
Figure 3A:
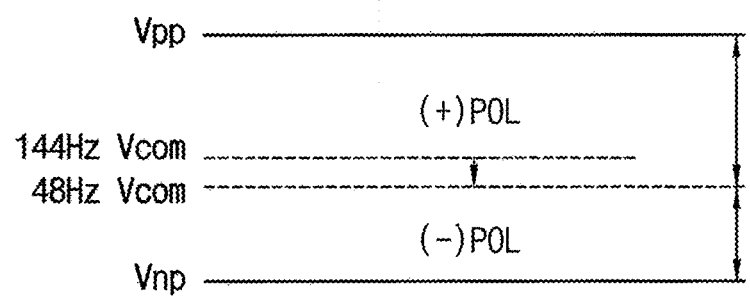
Figure 3B:
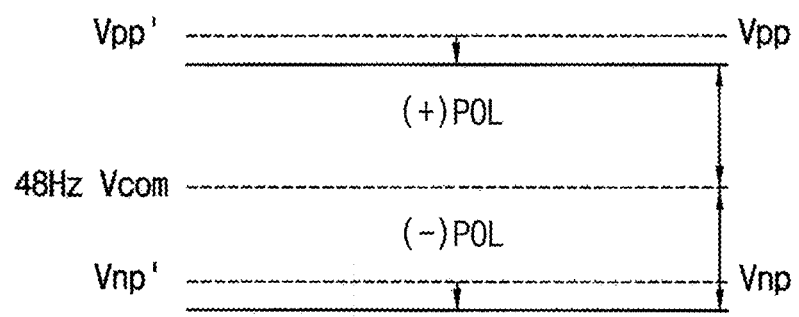
Figure 4:
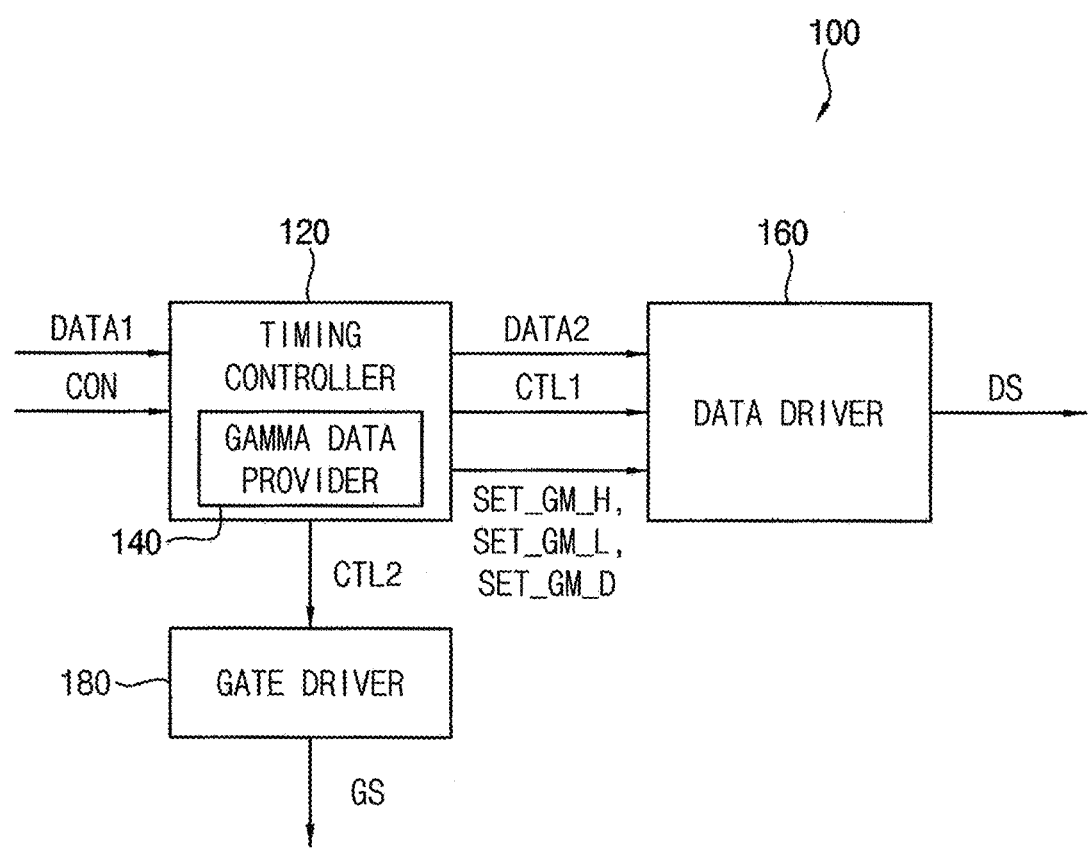
FIG. 4 is a block diagram illustrating other example of the driving device of the display panel of FIG. 1.

FIG. 1 is a block diagram illustrating a driving device of a display panel according to exemplary embodiments. FIGS. 2, 3A, and 3B are diagrams illustrating for describing an operation of a gamma data provider included in the driving device of the display panel of FIG. 1. FIG. 4 is a block diagram illustrating other example of the driving device of the display panel of FIG. 1.

Referring to FIG. 1, a driving device 100 of a display panel may include a timing controller 120, a gamma data provider 140, a data driver 160, and a gate driver 180.

The timing controller 120 may convert a first image data DATA1 provided from an external device to a second image data DATA2, and generate first and second control signals CTL1, CTL2 that control a driving timing of the second image data DATA2. In an exemplary embodiment, the external device may be a graphic processing unit ("GPU") that processes image information, for example. The timing controller 120 may receive the first image data DATA1 from the external device. The timing controller 120 may convert the first image data DATA1 to the second image data DATA2 by adjusting an algorithm (e.g., Dynamic Capacitance Compensation ("DCC")) that compensates display quality of the first image data DATA1. The first image data DATA1 may be output as the second image data DATA2 as itself when the timing controller 120 does not include the algorithm for improving the display quality. The timing controller may receive a control signal CON from the external device. The control signal CON may include a horizontal synchronized signal, a vertical synchronized signal, clock signals, etc. The timing controller 120 may generate a horizontal start signal using the horizontal synchronized signal. The timing controller 120 may generate a vertical start signal using the vertical synchronized signal. Further, the timing controller 120 may generate a first clock signal and a second clock signal using the clock signal. The timing controller 120 may provide the horizontal start signal and the first clock signal as the first control signal CTL1 to the data driver 160. The timing controller 120 may provide the vertical start signal and the second clock signal as the second control signal CTL2 to the gate driver 180.

The gamma data provider 140 may determine a driving frequency of the second image data based on the number of a count signal output during an active period and a blank period of the vertical synchronized signal. The gamma data provider 140 may output one of a plurality of gamma data sets SET_GM_H, SET_GM_L, SET_GM_D based on the driving frequency.

A method for preventing a defect of the image (e.g., a tearing of the image) by synchronizing a frequency of the graphic processor and the display panel is used. The graphic processor may provide the first image data DATA1 as change a frame rate. Thus, the driving frequency of the display panel may be changed. In an exemplary embodiment, the display panel may be driven as 144 Hertz (Hz) in a first frame, be driven as 48 Hz in an Nth frame, and be driven as 60 Hz in an Mth frame, for example. Here, leakage current may occur as a holding time of transistors included in a driving circuit that drives liquid crystal is delayed because the frequency of the display panel is changed. The defect such as flicker may occur when the frequency of the display panel is changed because of brightness decreased by the leakage current.

Referring to FIG. 3A, an optimum common voltage Vcom may be changed when the driving frequency of the display panel is changed in the Nth frame. Here, the brightness of the display panel may be changed because of a difference between a gap (Vpp−Vcom) of a positive polarity voltage Vpp and the common voltage Vcom and a gap (Vcom−Vnp) of the common voltage Vcom and the negative polarity voltage Vnp. Specifically, the common voltage Vcom may be changed when the driving frequency is changed from 144

Hz to 48 Hz in the Nth frame. Here, the difference between the gap (Vpp−Vcom) of the positive polarity voltage Vpp and the common voltage Vcom and the gap (Vcom−Vnp) of the common voltage Vcom and the negative polarity voltage Vnp may occur because the positive polarity voltage Vpp and the negative polarity voltage Vnp are fixed. The gamma data provider 140 of the driving device 100 of the display panel according to the exemplary embodiments may allow the gap (Vpp−Vcom) of the positive polarity voltage Vpp and the common voltage Vcom and a gap (Vcom−Vnp) of the common voltage Vcom and the negative polarity voltage Vnp to be the same by selecting and outputting one of the gamma data sets provided to the data driver 160 when the driving frequency of the display panel is changed. That is, the gamma data provider 140 may change the level of the positive polarity voltage Vpp' and the negative polarity voltage Vnp' as described in FIG. 3B by selecting and outputting the gamma data set SET_GM when the driving frequency is changed. Thus, the brightness may not be changed because the gap (Vpp'−Vcom) of the positive polarity voltage Vpp' and the common voltage Vcom and the gap (Vcom−Vnp') of the common voltage Vcom and the negative polarity voltage Vnp' are the same without changing the common voltage Vcom.

Referring to FIG. 2, a length of the blank period BP of the vertical synchronized signal may be changed according to the driving frequency. In an exemplary embodiment, the length of the blank period BP may increase when the driving frequency decreases, for example. Thus, a length of a frame that includes the active period AP and the blank period BP. The gamma data provider 140 may determine the driving frequency of the second image data DATA2 based on the length of the frame that includes the active period AP and the blank period BP. Specifically, the gamma data provider 140 may count the number of the counting signal output during the active period AP and the blank period BP of the vertical synchronized signal. Here, the counting signal may be a data enable signal having a uniform size and a regular cycle output during the active period AP and the blank period BP of the vertical synchronized signal and may be generated in the timing controller 120. The gamma data provider 140 may determine the driving frequency by comparing the number of the counting signal to a first reference number and a second reference number that are predetermined. The gamma data provider 140 may output the gamma select signal according to the driving frequency. The gamma data provider 140 may output one of a first gamma data set SET_GM_H for high frequency, a second gamma data set SET_GM_L for low frequency, and a third gamma data set SET_GM_D for default according to the gamma select signal. In an exemplary embodiment, the gamma data provider 149 may output the first gamma data set SET_GM_H for high frequency when the driving frequency is 144 Hz, output the second gamma data set SET_GM_L for low frequency when the driving frequency is 48 Hz, and output the third gamma data set SET_GM_D for default when the driving frequency is 60 Hz as described in FIG. 2, for example. Each of the first gamma data set SET_GM_H for high frequency, the second gamma data set SET_GM_L for low frequency, and the third gamma data set SET_GM_D for default may be implemented as a lookup table ("LUT") and be stored in a storage device.

Although the gamma data provider 140 coupled to the timing controller 120 is described in FIG. 1, the gamma data provider 140 is not limited thereto. As described in FIG. 4, the gamma data provider 140 may be located in the timing controller 120.

The driving device 100 of the display panel may further include a gamma reference voltage generator 190. The gamma reference voltage generator 190 may generate a gamma reference voltage VGRM that is a reference of gamma voltage generated in the data driver 160. In an exemplary embodiment, the gamma reference voltage generator 190 may generate a first gamma reference voltage, a second gamma reference voltage, a third gamma reference voltage, and a fourth gamma reference voltage, for example. Although the gamma reference voltage generator 190 coupled to the data driver 160 is described in FIG. 1, the gamma reference voltage generator 190 is not limited thereto. For example, the gamma reference voltage generator 190 may be located in the timing controller 120.

The data driver 160 may generate a data signal DS corresponding to the second image data DATA2 based on the gamma data set SET_GM, and may output the data signal DS to the data line of the display panel based on the first control signal CTL1. The data driver 160 may generate the gamma voltages based on the gamma reference voltage and the gamma data set SET_GM provided from the gamma data provider 140. A digital gamma unit of the data driver 160 may receive the first gamma reference voltage, the second gamma reference voltage, the third gamma reference voltage and the fourth gamma reference voltage. The data driver may generate the gamma voltages between the first gamma reference voltage and the second gamma reference voltage and the gamma voltages between the third gamma reference voltage and the fourth gamma reference voltage based on the gamma data set SET_GM. The data driver 160 may generate the data signal DS corresponding to the second image data DATA2 based on the gamma voltages. The data driver 160 may output the data signal DS to data lines of the display panel in response to the horizontal start signal and the first clock signal provided from the timing controller 120.

The gate driver 180 may generate and output a gate signal GS to gate lines of the display panel in response to the vertical start signal and the second clock signal provided from the timing controller 120.

As described above, the driving device 100 of the display panel of FIG. 1 may prevent driving frequency of the display panel to be changed by determining the driving frequency of the second image data DATA2 based on the active period AP and the blank period BP of the vertical synchronized signal of the second image data DATA2, outputting one of the gamma data set SET_GM according to the driving frequency, and generating the gamma voltage based on the gamma reference voltage and the gamma data set SET_GM. Thus, the brightness of the display panel may not be changed.

Figure 5:
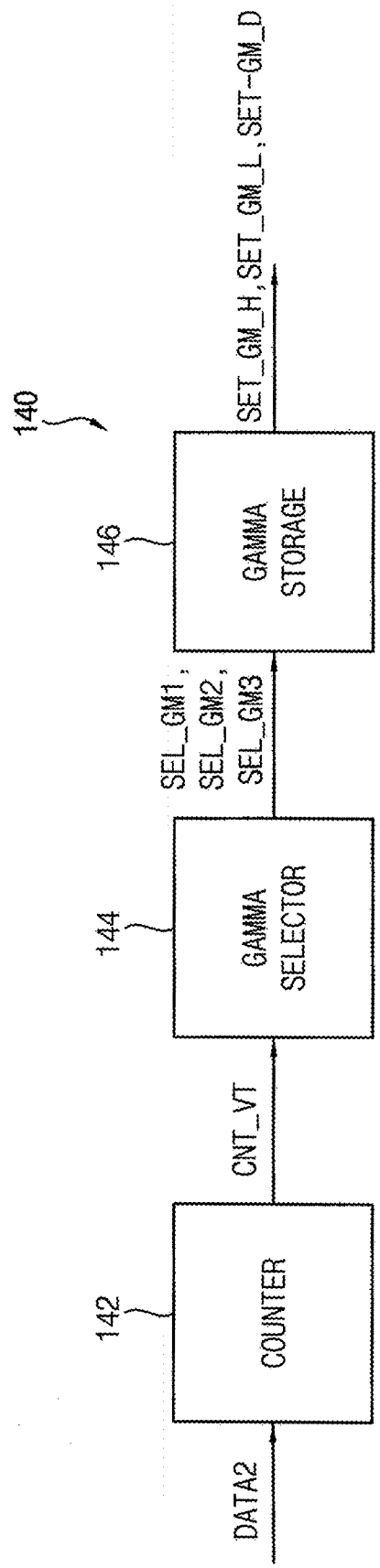
FIG. 5 is a block diagram illustrating a gamma data provider included in the driving device of the display panel of FIG. 1.
Figure 6A:
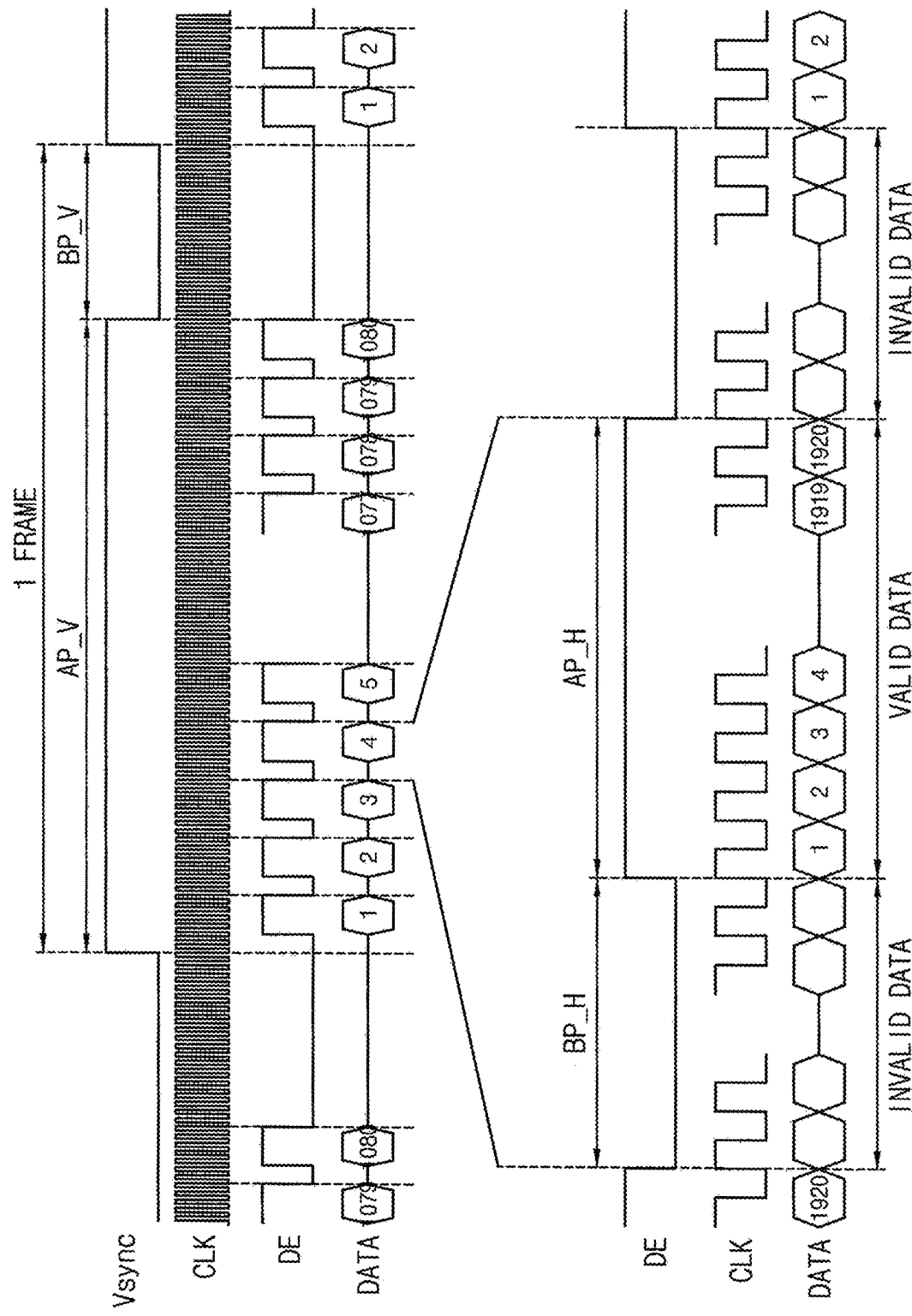
FIGS. 6A through 6C are diagrams illustrating for describing an operation of a counter included in the gamma data provider of FIG. 5.
Figure 6B:
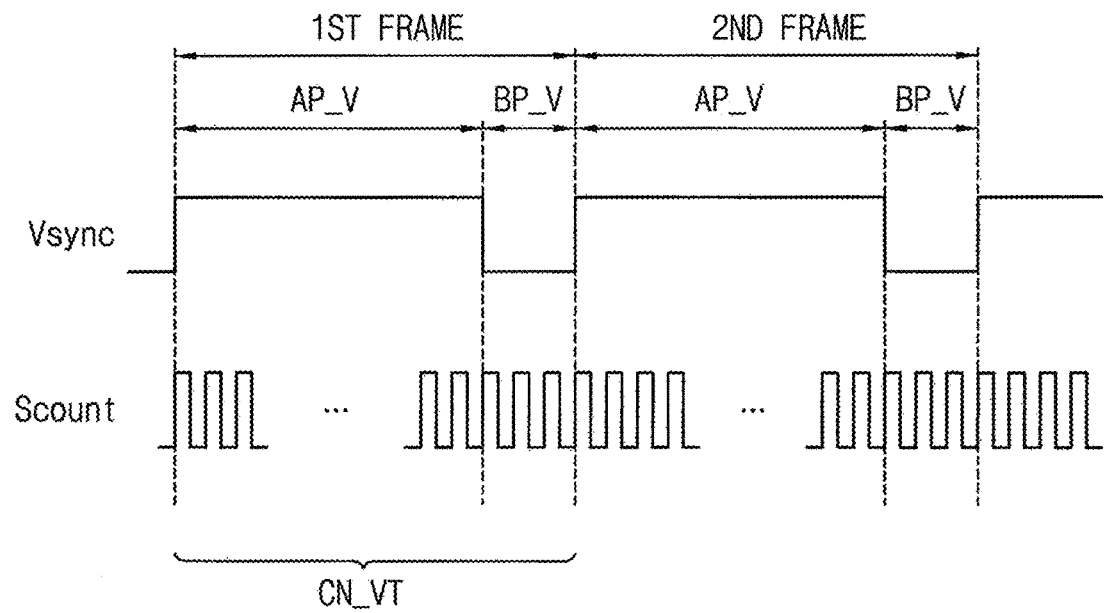
Figure 6C:
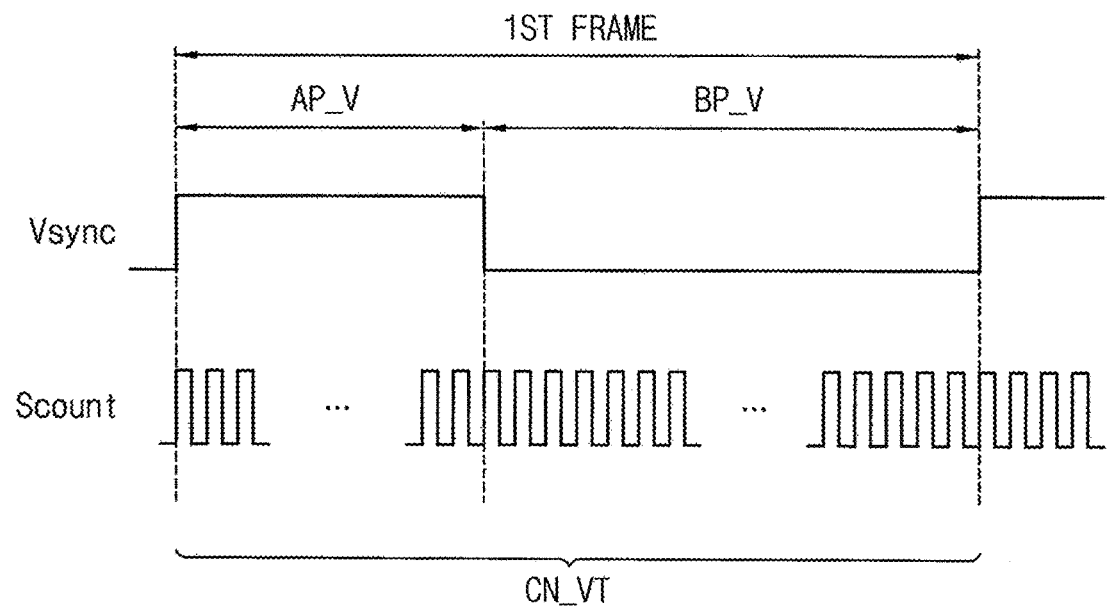
Figure 7:
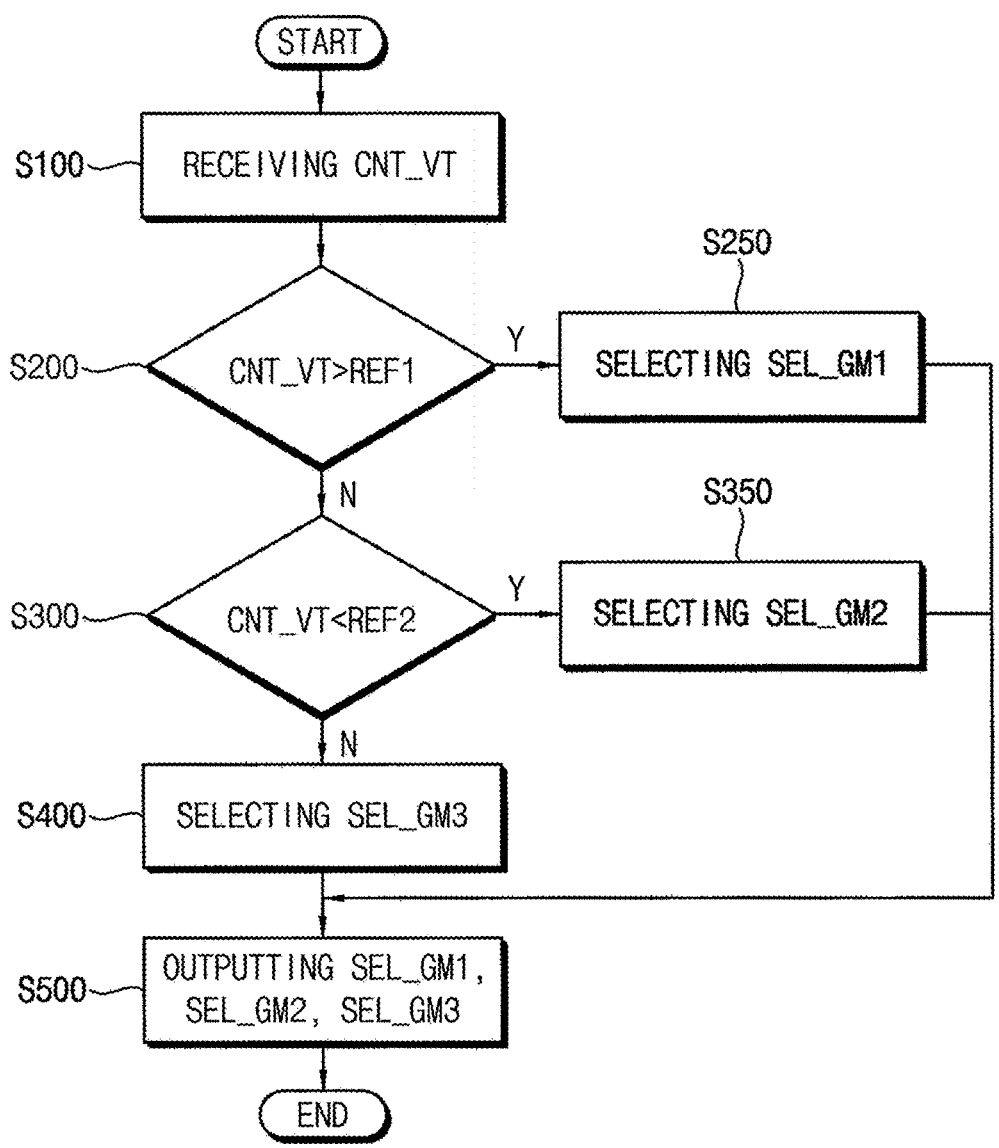
FIG. 7 is a flowchart illustrating for describing an operation of a gamma selector included in the gamma data provider of FIG. 5.

FIG. 5 is a block diagram illustrating a gamma data provider included in the driving device of the display panel of FIG. 1. FIGS. 6A through 6C are diagrams illustrating for describing an operation of a counter included in the gamma data provider of FIG. 5. FIG. 7 is a flowchart illustrating for describing an operation of a gamma selector included in the gamma data provider of FIG. 5.

Referring to FIG. 5, the gamma data provider 140 may include a counter 142, a gamma selector 144, and a gamma storage 146. The counter 142 may count the number of the counting signal output during the active period AP and the blank period BP of the vertical synchronized signal Vsync provided from the timing controller.

Referring to FIG. 6A, the timing controller may generate the vertical synchronized signal Vsync, a data enable signal DE, a clock signal CLK, etc. The display panel may output the data signal DATA based on vertical synchronized signal Vsync, the data enable signal DE, and the clock signal CLK. The vertical synchronized signal Vsync may be a signal to distinguish frame periods. The vertical synchronized signal Vsync may include an active period AP_V and a blank period BP_V. The data enable signal DE may input during the active period AP_V of the vertical synchronized signal Vsync. The data signal DATA may input by being synchronized with the data enable signal DE. The data enable signal DE may include an active period AP_H and a blank period BP H. In an exemplary embodiment, 1080 of the data enable signal DE may input during the active period AP_V of the vertical synchronized signal Vsync, and 1920 of the data signal DATA may input during each of the active period AP_H of the data enable signal DE when the display panel has a resolution 1920*1080, for example.

The counter 142 may determine the driving frequency of the display panel based on the vertical synchronized signal Vsync generated in the timing controller. Referring to FIGS. 6B and 6C, the blank period BP_V of the vertical synchronized signal Vsync may be changed when the driving frequency of the display panel is changed. In an exemplary embodiment, the length of the frame may increase as the blank period BP_V of the vertical synchronized signal Vsync increases when the driving frequency decreases, for example. The counter 142 may count the number CNT_VT of the counting signal Scount output during the active period AP_V and the blank period BP_V of the vertical synchronized signal Vsync. Here, the counting signal Scount may be the data enable signal having a uniform size and a regular cycle output during the active period AP_V and the blank period BP_V of the vertical synchronized signal Vsync. The counting signal Scount may be generated in the timing controller. In an alternative exemplary embodiment, the counting signal Scount may be a clock signal CLK having a uniform size and a regular cycle output during the active period AP_V and the blank period BP_V of the vertical synchronized signal Vsync. The gamma data provider 140 may determine the driving frequency of the display panel based on the number CNT_VT of the counting signal Scount. In an exemplary embodiment, the gamma data provider 140 may determine that the driving frequency is decreased when the counting number CNT_VT of the counting signal Scount increases, and the driving frequency increases when the number CNT_VT of the counting signal Scount decreases, for example. Here, the length of the active period AP_V (i.e., the number CNT_VT of the counting signal Scount) may be uniform and the length of the blank period BP_V (i.e., the number CNT_VT of the counting signal Scount) may be changed. In an exemplary embodiment, the gamma data provider 140 may count 1080 of counting signal Scount during the active period AP_V in a the first frequency, may count 100 of counting signal Scount during the blank period BP_V in the first frequency, may count 1080 of counting signal Scount during the active period AP_V in a second frequency, and may count 300 of counting signal Scount during the blank period BP_V in the second frequency when the driving frequency is changed from the first frequency to the second frequency in the display panel having a resolution 1920*1080, for example.

Referring to FIG. 7, the gamma selector 144 may output the gamma select signal based on the number CNT_VT of the counting signal Scount. The gamma selector 144 may receive the number CNT_VT of the counting signal Scount from the counter 142 (S100). The gamma selector 144 may compare the number CNT_VT of the counting signal Scount to the first reference number REF1 (S200). The gamma selector 144 may select a first gamma select signal SEL_GM1 when the number CNT_VT of the counting signal Scount is greater than the first reference number REF1 (S250). The gamma selector 144 may compare the number CNT_VT of the counting signal Scount to the second reference number REF2 when the number CNT_VT of the counting signal Scount is equal to or less than the first reference number REF1 (S300). Here, the second reference number REF2 is less than the first reference number REF1. The gamma selector 144 may select a second gamma select signal SEL_GM2 when the number CNT_VT of the counting signal Scount is less than the second reference number REF2 (S350). The gamma selector 144 may select a third gamma select signal SEL_GM3 when the number CNT_VT of the counting signal Scount is equal to or greater than the second reference number REF2 (S400). The gamma selector 144 may output one of the first gamma select signal SEL_GM1, the second gamma select signal SEL_GM2, and the third gamma select signal SEL_GM3 (S500). In an exemplary embodiment, the first reference number REF1 is 1380 and the second reference number REF2 is 1180 when the display panel has a resolution 1920*1080, for example. The gamma selector 144 may output the first gamma select signal SEL_GM1 when the number CNT_VT of the counting signal Scount is greater than 1380. The gamma selector 144 may output the second gamma select signal SEL_GM2 when the number CNT_VT of the counting signal Scount is less than 1180. The gamma selector 144 may output the third SEL_GM2 when the number CNT_VT of the counting signal Scount is equal to or greater than 1180 and equal to or less than 1380. The gamma storage 146 may to store the plurality of gamma sets SET_GM_H, SET_GM_L, SET_GM_D and output one of the gamma data sets SET_GM_H, SET_GM_L, SET_GM_D based on the gamma select signal SEL_GM1, SEL_GM2, SEL_GM3. The gamma storage 146 may include the first gamma data set SET_GM_H for high frequency output in response to the first gamma select signal SEL_GM1, the second gamma data set SET_GM_L for low frequency output in response to the second gamma select signal SEL_GM2, and the third gamma data set SET_GM_D for default output in response to the second gamma select signal SEL_GM3. Each of the first gamma data set SET_GM_H, the second gamma data set SET_GM_L, and the third gamma data set SET_GM_D may be implemented as an LUT. Each of the first gamma data set SET_GM_H, the second gamma data set SET_GM_L, and the third gamma data set SET_GM_D may store gamma voltages except for the reference gamma voltage.

As described above, the gamma data provider 140 may provide one of the gamma data set SET_GM_H, SET_GM_L, SET_GM_D corresponding to the driving frequency of the display panel by including the counter 142 that counts the number CNT_VT of the counting signal Scount output during the active period AP_V and the blank period BP_V of the vertical synchronized signal Vsync, the gamma selector 144 that outputs one of the gamma select signals SEL_GM1, SEL_GM2, SEL_GM3 based on the number CNT_VT of the counting signal Scount, and the gamma storage 146 that outputs one of the gamma data sets SET_GM_H, SET_GM_L, SET_GM_D based on the gamma select signal SEL_GM1, SEL_GM2, SEL_GM3.

Figure 8:
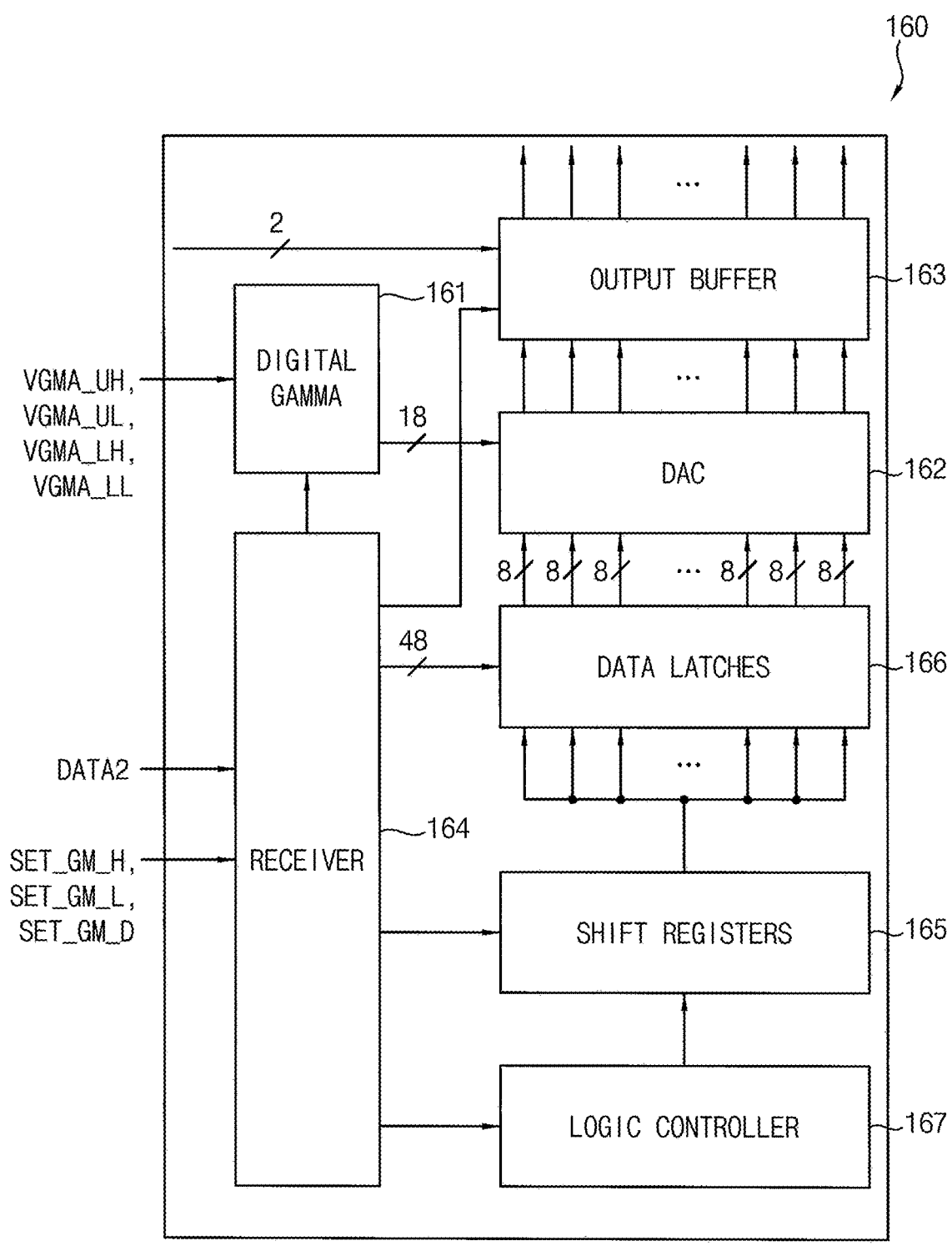
FIG. 8 is a block diagram illustrating a data driver included in the driving device of the display panel of FIG. 1.

FIG. 8 is a block diagram illustrating a data driver included in the driving device of the display panel of FIG. 1.

Referring to FIG. 8, the data driver 160 may include a digital gamma unit 161, a digital-analog converter ("DAC") 162, and an output buffer 163. Further, the data driver 160 may further include a receiver 164, a shift register 165, a data latch 166, a logic controller 167, etc. In an exemplary embodiment, interface such as mini-LVDS, RSDS, AiPi, USI-T, USI_GF may be used to process the signal between the data driver 160 and the timing controller, for example. Here, the timing controller may include the gamma data provider or may be coupled to the gamma data provider. The receiver 164 of the data driver 160 may receive the data from the timing controller using one of the interfaces described above.

The receiver 164 may receive the gamma data set SET_GM_H, SET_GM_L, SET_GM_D and the second image data DATA2 from the gamma data provider. The shift register 165 may receive the clock signal and I/O control signal and generate pulse signal based on the clock signal. The data latch 166 may receive the second image data DATA2 and a load signal, latch the second image data DATA2 according to a shift order of the shift register 165, and output the second image data DATA2 when the load signal is applied.

The digital gamma unit 161 may generate the gamma voltage based on the gamma reference voltage VGMA_UH, VGMA_UL, VGMA_LH, VGMA_LL and the gamma data set SET_GM_H, SET_GM_L, SET_GM_D (refer to FIG. 1) provided from the gamma data provider. The driving device of the display panel may further include a gamma reference voltage generator that generates the gamma reference voltage VGMA_UH, VGMA_UL, VGMA_LH, VGMA_LL. The gamma reference voltage generator may generate at least one gamma reference voltage VGMA_UH, VGMA_UL, VGMA_LH, VGMA_LL. The digital gamma unit 161 may receive the gamma reference voltage VGMA_UH, VGMA_UL, VGMA_LH, VGMA_LL. Further, the digital gamma unit 161 may receive the gamma data set SET_GM_H, SET_GM_L, SET_GM_D provided from the gamma data provider through the receiver 164. The digital gamma unit 161 may generate gamma voltages between the gamma reference voltages VGMA_UH, VGMA_UL, VGMA_LH, VGMA_LL using the gamma data set SET_GM_H, SET_GM_L, SET_GM_D. In an exemplary embodiment, the data driver 160 may receive a first gamma reference voltage VGM_UH, a second gamma reference voltage VGM_UL, a third gamma reference voltage VGM_LH, and a fourth gamma reference voltage VGM_LL, for example. The data driver 160 may generate gamma voltages between the first gamma reference voltage VGM_UH and the second gamma reference voltage VGM_UL and the gamma voltages between the third gamma reference voltage VGM_LH and the fourth gamma reference voltage VGM_LL using the gamma data set SET_GM_H, SET_GM_L, SET_GM_D. The digital gamma unit 161 may generate the gamma voltages corresponding to a second grayscale through a eight grayscale using the gamma data set when the first gamma reference voltage VGM_UH corresponds to a first grayscale and the second gamma reference voltage VGM_UL corresponds to a ninth grayscale. The digital gamma unit 161 may generate the gamma voltages corresponding to an eleventh grayscale through a seventeenth grayscale using the gamma data set when the third gamma reference voltage VGM_LH corresponds to a tenth grayscale and the fourth gamma reference voltage VGM_LL corresponds to a eighteenth grayscale.

The gamma data provider may output one of the first gamma data set SET_GM_H, the second gamma data set SET_GM_L, and the third gamma data set SET_GM_D. The digital gamma unit 161 may generate gamma voltages having different levels according to the driving frequency because the gamma data provider provides different gamma data set according to the driving frequency. That is, the digital gamma unit 161 may generate different gamma voltages between the first gamma reference voltage VGM_UH and the second gamma reference voltage VGM_UL, and different gamma voltages between the third gamma reference voltage VGM_LH and the fourth gamma reference voltage VGM_LL according to the gamma data set.

The DAC 162 may generate a gamma data signal corresponding to the second image data DATA2 based on the gamma voltage. The DAC 162 may generate gamma data signals corresponding to each of the grayscales using a predetermined R-string based on the gamma voltages provided from the digital gamma unit 161 and may output the gamma data signal corresponding to the second image data DATA2. Here, the second image data DATA2 may be a digital signal and the gamma data signal may be an analog signal. In an exemplary embodiment, the DAC 162 may generate gamma data signals of 256 grayscales referring to the 18 gamma voltages provided form the digital gamma unit 161 and may output the gamma data signals corresponding to the second image data DATA2, for example. The DAC 162 may transfer the gamma data signal to the output buffer 163.

The output buffer 163 may convert the gamma data signal to the data signal and output the data signal. The output buffer 163 may sequentially convert the gamma data signal and sequentially output the data signal to the pixels in the display panel through the data line. In some exemplary embodiments, the output buffer 163 may include an amplifier that amplifies the gamma data signal. In this case, the gamma data signal provided from the DAC 162 may be amplified and output as the data signal. In other exemplary embodiments, the output buffer 163 may include a voltage follower that output the gamma data signal as itself. In this case, a voltage level of the gamma data signal provided from the DAC 162 may not be changed and output as the data signal. The output buffer 163 may provide the data signal to the pixels through the data line by controlling an output timing.

Figure 9:
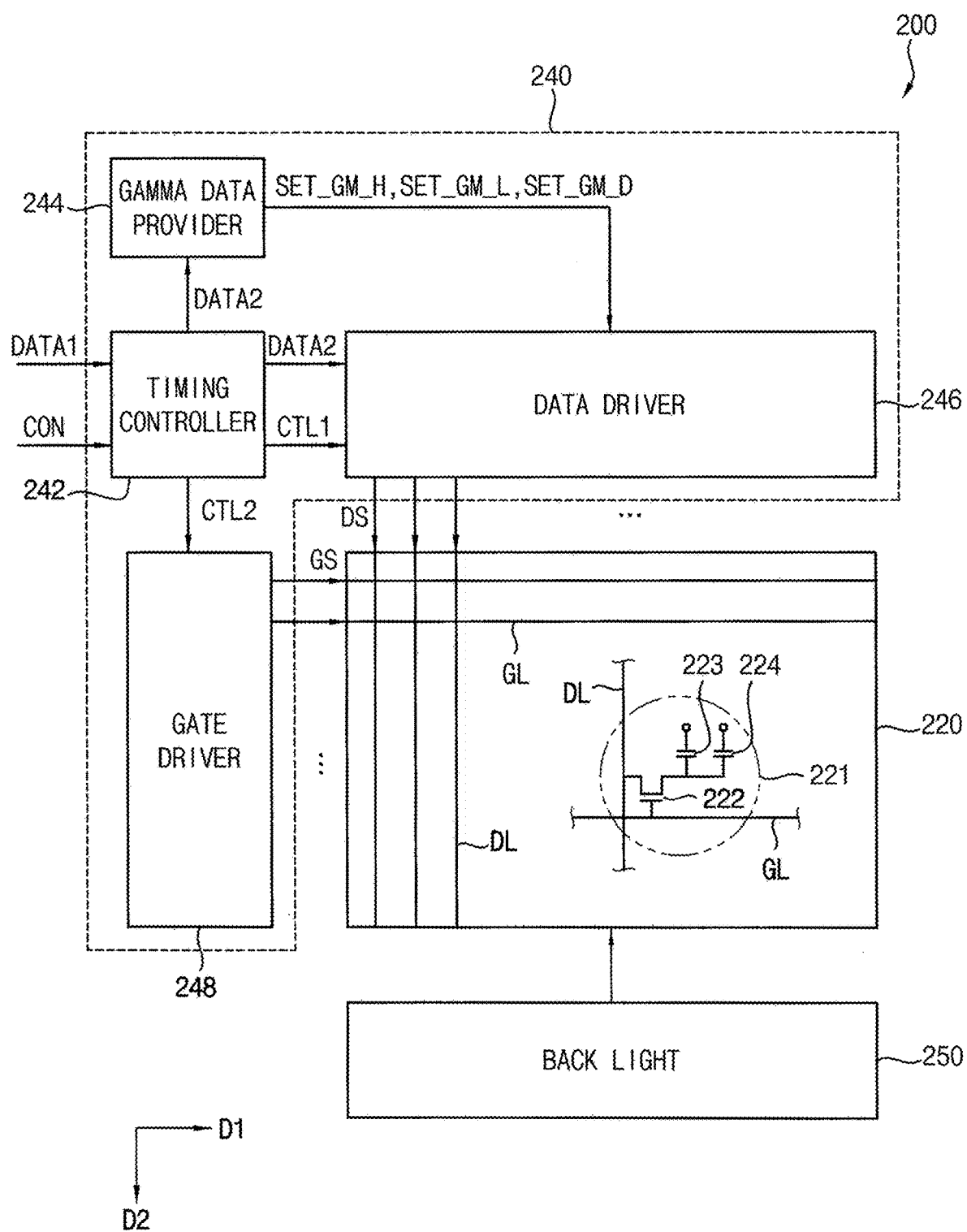
FIG. 9 is a block diagram illustrating an exemplary embodiment of a display device.
Figure 10:
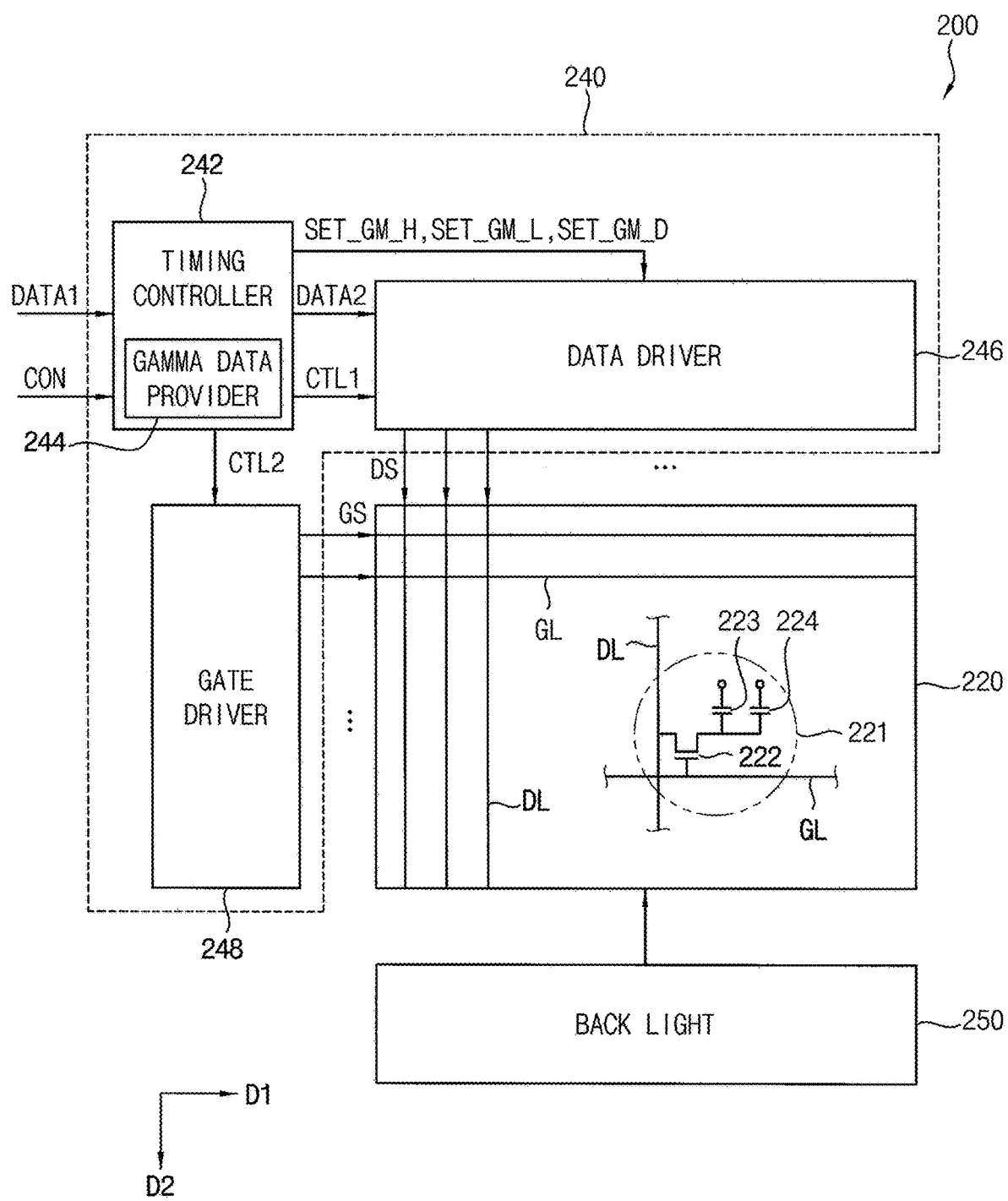
FIG. 10 is a block diagram illustrating other example of the display device of FIG. 9.

FIG. 9 is a block diagram illustrating a display device according to exemplary embodiments. FIG. 10 is a block diagram illustrating other example of the display device of FIG. 9.

Referring to FIG. 9, a display device 200 may include a display panel 220, a driver 240, and a backlight unit 250.

The display panel 220 may include data lines DL, gate lines GL, and a plurality of pixels 221. The gate lines GL may extends in a first direction D1 and be arranged in a second direction D2 substantially perpendicular to the first direction D1. The first direction D1 may be parallel with a long side of the display panel 220, and the second direction D2 may be parallel with the short side of the display panel 220. Each of the pixel 221 may be provided in an intersection region of the data line DL and the gate line GL. Each of the pixels may include a thin film transistor ("TFT") 222 electrically coupled to the gate line GL and the data line DL, a liquid crystal capacitor 223 and a storage capacitor 224 coupled to the TFT 222. Thus, the display panel 220 may be a liquid crystal panel, and the display device 200 may be a liquid crystal display ("LCD") device. The LCD panel may display an image using light provided from the backlight unit 250.

The driver 240 may provide a data signal DS and a gate signal GS for driving the display panel 220 to the data line DL and the gate line GL in the display panel 220. The driver 240 may include a timing controller 242, a gamma data provider 244, a data driver 246, and a gate driver 248.

The timing controller 242 may convert a first image data DATA1 provided from an external device to the second image data DATA2 and generate control signals CTL1, CTL2 that controls a driving timing of the second image data DATA2. In an exemplary embodiment, the external device may be a graphic processing unit that processes image information, for example. The timing controller 242 may convert the first image data DATA1 to the second image data DATA2 by adjusting an algorithm (e.g., DCC) that compensates display quality of the first image data DATA1. The timing controller may receive a control signal CON from the external device, and generate a horizontal start signal and a first clock signal provided to the data driver 246, and a vertical start signal and a second clock signal provided to the gate driver 248. The timing controller 242 may provide the horizontal start signal and the first clock signal to the data driver 246 as a first control signal CTL1 and the vertical start signal and the second clock signal to the gate driver 248 as a second control signal CTL2.

The gamma data provider 244 may determine a driving frequency of the second image data DATA2 based on the number of a counting signal output during an active period and a blank period of the vertical synchronized signal, and output one of a gamma data sets SET_GM_H, SET_GM_L, SET_GM_D according to the driving frequency. The gamma data provider 244 may determine the driving frequency by comparing the number of the counting signal to a predetermined first reference number and a predetermined second reference number, and output a gamma select signal according to the driving frequency. The gamma data provider 244 may output one of the first gamma data set SET_GM_H for high frequency, the second gamma data set SET_GM_L for low frequency, and the third gamma data set SET_GM_D for default according to the gamma select signal. Each of the first gamma data set SET_GM_H for high frequency, the second gamma data set SET_GM_L for low frequency, and the third gamma data set SET_GM_D may be implemented as the LUT and be stored in a storage device.

Although the gamma data provider 244 coupled to the timing controller 242 is described in FIG. 9, the gamma data provider 244 may not be limited thereto. The gamma data provider 244 may be located in the timing controller 242 as described in FIG. 10. The driver 240 of the display panel 220 may further include a gamma reference voltage generator that generates a gamma reference voltage. The gamma reference voltage generator may be coupled to the timing controller 242 or may be located in the timing controller 242.

The data driver 246 may generate a data signal DS corresponding to the second image data DATA2 based on the gamma data set SET_GM_H, SET_GM_L, SET_GM_D, and output the data signal DS to the data line DL in the display panel 220 based on the first control signal CTL1. The data driver 246 may receive a first gamma reference voltage, a second gamma reference voltage, a third gamma reference voltage, and a fourth gamma reference voltage from the gamma reference voltage generator. The data driver 246 may receive one of gamma data sets SET_GM_H, SET_GM_L, SET_GM_D from the gamma data provider 244. The data driver 246 may generate gamma voltages between the first gamma reference voltage and the second gamma reference voltage, and gamma voltages between the third gamma reference voltage and the fourth gamma reference voltage using one of the gamma data sets SET_GM_H, SET_GM_L, SET_GM_D. The data driver 246 may generate the data signal DS corresponding to the second image data DATA2 based on the gamma voltage. The data driver 246 may output the data signal DS to the data line DL in the display panel 220 in response to the horizontal start signal and the first clock signal provided from the timing controller 242.

The gate driver 248 may generate the gate signal GS in response to the vertical start signal and the second clock signal and output the gate signal GS to the gate line GL.

As described above, the display device 200 of FIGS. 9 and 10 may prevent the driving frequency of the display device 200 to be changed by determining the driving frequency of the second image data DATA2 based on the number of the counting signal output during the active period and the blank period of the vertical synchronized signal of the second image data DATA2, outputting one of the gamma data sets SET_GM_H, SET_GM_L, SET_GM_D according to the driving frequency, and generating the gamma voltage based on the gamma reference voltage and the gamma data set SET_GM_H, SET_GM_L, SET_GM_D. Thus, the display device 200 may prevent brightness to be changed by the driving frequency.

Figure 11:
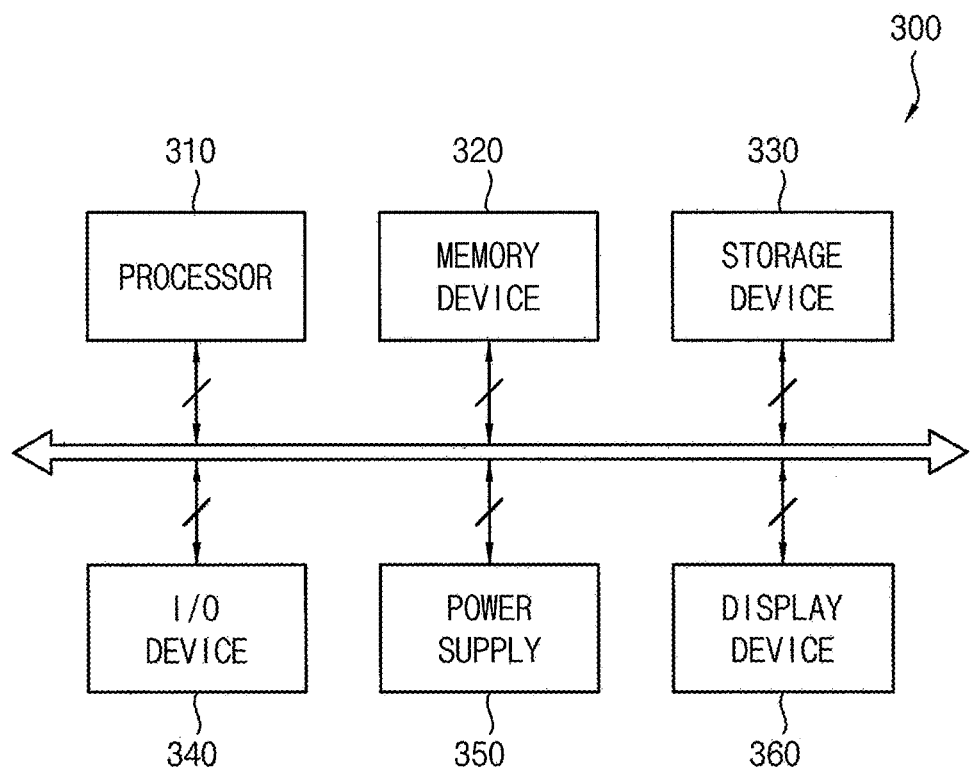
FIG. 11 is a block diagram illustrating an electronic device that includes the display device of FIG. 9.
Figure 12:
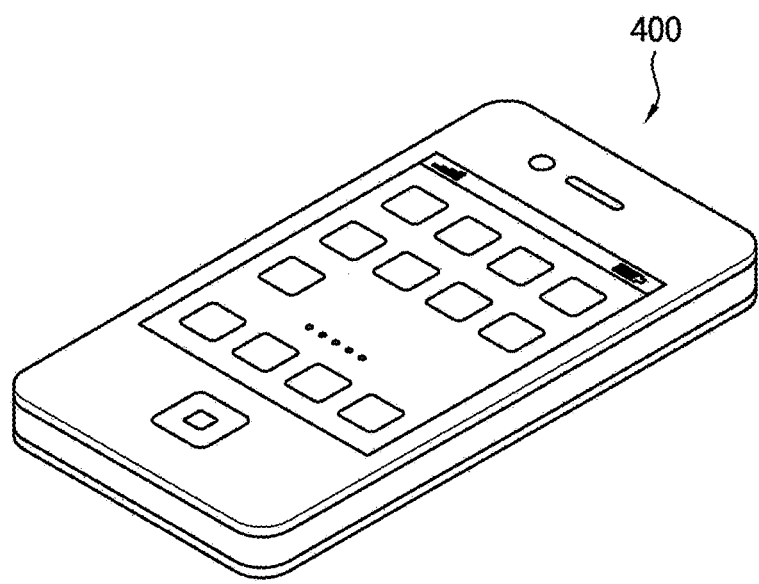
FIG. 12 is a diagram illustrating an exemplary embodiment in which the electronic device of FIG. 11 is implemented as a smart phone.

FIG. 11 is a block diagram illustrating an electronic device that includes the display device of FIG. 9, and FIG. 12 is a diagram illustrating an exemplary embodiment in which the electronic device of FIG. 11 is implemented as a smart phone.

Referring to FIGS. 11 and 12, an electronic device 300 may include a processor 310, a memory device 320, a storage device 330, an input/output ("I/O") device 340, a power device 350, and a display device 360. Here, the display device 360 may correspond to the display device 200 of FIG. 9. In addition, the electronic device 300 may further include a plurality of ports for communicating a video card, a sound card, a memory card, a universal serial bus ("USB") device, other electronic device, etc. Although it is illustrated in FIGS. 11 and 12 that the electronic device 300 is implemented as a smart phone 400, a kind of the electronic device 300 is not limited thereto.

The processor 310 may perform various computing functions. In an exemplary embodiment, the processor 310 may be a micro processor, a central processing unit ("CPU"), etc. In an exemplary embodiment, the processor 310 may be coupled to other components via an address bus, a control bus, a data bus, etc. In an exemplary embodiment, the processor 310 may be coupled to an extended bus such as surrounded component interconnect ("PCI") bus, for example. The memory device 320 may store data for operations of the electronic device 300. In an exemplary embodiment, the memory device 320 may include at least one non-volatile memory device such as an erasable programmable read-only memory ("EPROM") device, an electrically erasable programmable read-only memory ("EEPROM") device, a flash memory device, a phase change random access memory ("PRAM") device, a resistance random access memory ("RRAM") device, a nano floating gate memory ("NFGM") device, a polymer random access memory ("PoRAM") device, a magnetic random access memory ("MRAM") device, a ferroelectric random access memory ("FRAM") device, etc., and/or at least one volatile memory device such as a dynamic random access memory ("DRAM") device, a static random access memory ("SRAM") device, a mobile DRAM device, etc., for example. The storage device 330 may be a solid stage drive ("SSD") device, a hard disk drive ("HDD") device, a CD-ROM device, etc.

The I/O device 340 may be an input device such as a keyboard, a keypad, a touchpad, a touch-screen, a mouse, etc., and an output device such as a printer, a speaker, etc. In some exemplary embodiments, the display device 360 may be included in the I/O device 340. The power device 350 may provide a power for operations of the electronic device 300. The display device 360 may communicate with other components via the buses or other communication links. As described above, the display device 360 may include a display panel and a driver. The display panel may include data lines, gate lines, and a plurality of pixels. The driver may include a timing controller, a gamma data provider, a data driver, and a gate driver. The timing controller may convert a first image data provided from an external device to a second image data and generate control signals that control a driving timing of the second image data. The gamma data provider may determine a driving frequency of the second image data based on a number of a counting signal output during an active period and a blank period of the vertical synchronized signal, and output one of gamma data sets based on the driving frequency. The gamma data provider may determine the driving frequency of the second image data by comparing the number of the counting signal to a predetermined first reference number and a second predetermined reference number. In an exemplary embodiment, the gamma data provider may determine the driving frequency as a high-frequency when the number of the counting signal is greater than the first reference number, for example. The gamma data provider may determine the driving frequency as a low-frequency when the number of the counting signal is less than the second reference number. The gamma data provider may determine the driving frequency as a default frequency when the number of the counting signal is small than the first reference number and greater than the second reference number. The gamma data provider may provide one of a first gamma data set for high frequency, a second gamma data set for low frequency, and a third gamma data set for default according to the number of the counting signal to the data driver. Here, each of the first gamma data set for high frequency, the second gamma data set for low frequency, and the third gamma data set for default may be implemented as an LUT. The data driver may generate the data signal based on the gamma reference voltage and the gamma data set. The data driver may generate gamma voltages between the gamma reference voltages based on the gamma data set. The data driver may provide the data signal corresponding to the second image data based on the gamma voltages to the pixels in the display panel through the data line of the display panel. The gate driver may generate the gate signal based on the control signal provided from the timing controller and provide the pixels in the display panel through the gate line in the display panel.

As described above, the electronic device of FIG. 11 may prevent brightness of the display device to be changed when the driving frequency is changed by including the display device that determines the driving frequency based on the number of the counting signal output during the active period and the blank period of the vertical synchronized signal, and changing the gamma data set according to the driving frequency. Thus, display quality of the display device may improve.

The invention may be applied to a display device and an electronic device having the display device. In an exemplary embodiment, the invention may be applied to a computer monitor, a laptop, a digital camera, a cellular phone, a smart phone, a smart pad, a television, a personal digital assistant ("PDA"), a portable multimedia player ("PMP"), a MP3 player, a navigation system, a game console, a video phone, etc., for example The foregoing is illustrative of exemplary embodiments and is not to be construed as limiting thereof. Although a few exemplary embodiments have been described, those skilled in the art will readily appreciate that many modifications are possible in the exemplary embodiments without materially departing from the novel teachings and advantages of the invention. Accordingly, all such modifications are intended to be included within the scope of the invention as defined in the claims. Therefore, it is to be understood that the foregoing is illustrative of various exemplary embodiments and is not to be construed as limited to the specific exemplary embodiments disclosed, and that modifications to the disclosed exemplary embodiments, as well as other exemplary embodiments, are intended to be included within the scope of the appended claims.

What is claimed is:

1. A driving device of a display panel comprising:
   a timing controller which converts a first image data provided from an external device to a second image data, and generates control signals which control a driving timing of the second image data;
   a gamma data provider which determines a driving frequency of the second image data based on a number of a counting signal output during an active period and a blank period of a vertical synchronized signal, and outputs one of a plurality of gamma data sets based on the driving frequency;
   a data driver which generates a data signal corresponding to the second image data based on the one of the plurality of gamma data sets, and provides the data signal to a data line of a display panel based on the control signal; and
   a gate driver which provides the gate signal to a gate line of the display panel based on the control signal.

2. The driving device of the display panel of claim 1, wherein the gamma data provider includes:
   a counter which counts the number of the counting signal output during the active period and the blank period of the vertical synchronized signal;
   a gamma selector which outputs a gamma select signal based on the number of the counting signal; and
   a gamma storage which stores the plurality of gamma data sets, and outputs the one of the plurality of gamma data sets based on the gamma select signal.

3. The driving device of the display panel of claim 2, wherein the gamma selector compares the number of the counting signal to a first reference number and a second reference number less than the first reference number and outputs the gamma select signal based on a comparing result.

4. The driving device of the display panel of claim 3, wherein the gamma selector outputs a first gamma select signal when the number of the counting signal is larger than the first reference number, outputs a second gamma select signal when the number of the counting signal is less than the second reference number, and outputs a third gamma select signal when the number of the counting signal is less than the first reference number and larger than the second reference number.

5. The driving device of the display panel of claim 4, wherein the gamma storage includes:
   a first gamma data set for high frequency which is output in response to the first gamma select signal;

a second gamma data set for low frequency which is output in response to the second gamma select signal; and a third gamma data set for default which is output in response to the third gamma select signal.

6. The driving device of the display panel of claim 2, wherein the counting signal is a data enable signal output as a uniform size and a regular cycle during the active period and the blank period of the vertical synchronized signal.

7. The driving device of the display panel of claim 1, wherein the plurality of gamma data sets is implemented as a lookup table.

8. The driving device of the display panel of claim 1, wherein the gamma data provider is coupled to the timing controller.

9. The driving device of the display panel of claim 1, wherein the gamma data provider is located in the timing controller.

10. The driving device of the display panel of claim 1, further comprising:
a gamma reference voltage generator which generates a gamma reference voltage provided to the data driver.

11. The driving device of the display panel of claim 1, wherein the data driver includes:
a digital gamma unit which generates a gamma voltage based on a gamma reference voltage and the one of the plurality of gamma data sets provided from the gamma data provider;
a digital-analog convertor which generates a gamma data signal corresponding to the second image data based on the gamma voltage; and
an output buffer which converts the gamma data signal to the data signal and output the data signal.

12. The driving device of the display panel of claim 10, wherein the digital gamma unit receives a first gamma reference voltage, a second gamma reference voltage, a third gamma reference voltage and a fourth gamma reference voltage, and
wherein the digital gamma unit generates gamma voltages between the first gamma reference voltage and the second gamma reference voltage and gamma voltages between the third gamma reference voltage and the fourth gamma reference voltage based on the one of the plurality of gamma data sets.

13. The driving device of the display panel of claim 11, wherein the output buffer amplifies the gamma data signal and convert to the data signal.

14. The driving device of the display panel of claim 11, wherein the output buffer controls an output timing of the data signal.

15. A display device comprising:
a display panel including a plurality of pixels; and
a driver which provides a data signal and a gate signal to the pixels, and
wherein the driver includes:
a timing controller which converts a first image data provided from an external device to a second image data and generates control signals which control a driving timing of the second image data;
a gamma data provider which determines a driving frequency of the second image data based on a number of a counting signal output during an active period and a black period of a vertical synchronized signal, and outputs one of a plurality of gamma data sets based on the driving frequency;
a data driver which generates the data signal corresponding to the second image data based on the one of the plurality of gamma data sets, and outputs the data signal to a data line of the display panel based on the control signals; and
a gate driver which outputs the gate signal to a gate line of the display panel based on the control signals.

16. The display device of claim 15, wherein the gamma data provider includes:
a counter which counts the number of the counting signal output during the active period and the blank period of the vertical synchronized signal;
a gamma selector which outputs a gamma select signal based on the number of the counting signal; and
a gamma storage which stores a plurality of gamma data sets, and outputs the one of the plurality of gamma data sets based on the gamma select signal.

17. The display device of claim 16, wherein the gamma selector compares the number of the counting signal to a first reference number and a second reference number less than the first reference number and outputs the gamma select signal based on a comparing result.

18. The display device of claim 17, wherein the gamma selector outputs a first gamma select signal when the number of the counting signal is larger than the first reference number, outputs a second gamma select signal when the number of the counting signal is less than the second reference number, and outputs a third gamma select signal when the number of the counting signal is less than the first reference number and larger than the second reference number.

19. The display device of claim 17, wherein the gamma storage includes:
a first gamma data set for high frequency which is output in response to the first gamma select signal;
a second gamma data set for low frequency which is output in response to the second gamma select signal; and
a third gamma data set for default which is output in response to the third gamma select signal.

20. The display device of claim 15, wherein the data driver includes:
a digital gamma unit which generates a gamma voltage based on a gamma reference voltage and the one of the plurality of gamma data sets provided from the gamma data provider;
a digital-analog convertor which generates a gamma data signal corresponding to the second image data based on the gamma voltage; and
an output buffer which converts the gamma data signal to the data signal and output the data signal.

* * * * *